Aug. 31, 1937.　　　　　H. D. COLMAN　　　　　2,091,268
CLUTCH MECHANISM
Filed March 5, 1934　　　　4 Sheets-Sheet 1

INVENTOR
Howard D. Colman
BY
Chindahl, Parker & Carlson
ATTORNEYS

Aug. 31, 1937.  H. D. COLMAN  2,091,268
CLUTCH MECHANISM
Filed March 5, 1934  4 Sheets-Sheet 2

INVENTOR
Howard D. Colman
BY
Chindahl, Parker & Carlson
ATTORNEYS

Aug. 31, 1937.  H. D. COLMAN  2,091,268
CLUTCH MECHANISM
Filed March 5, 1934  4 Sheets-Sheet 3

INVENTOR
Howard D. Colman
BY
Chindahl, Parker & Carlson
ATTORNEYS

Aug. 31, 1937.                H. D. COLMAN                2,091,268
                           CLUTCH MECHANISM
                         Filed March 5, 1934          4 Sheets-Sheet 4
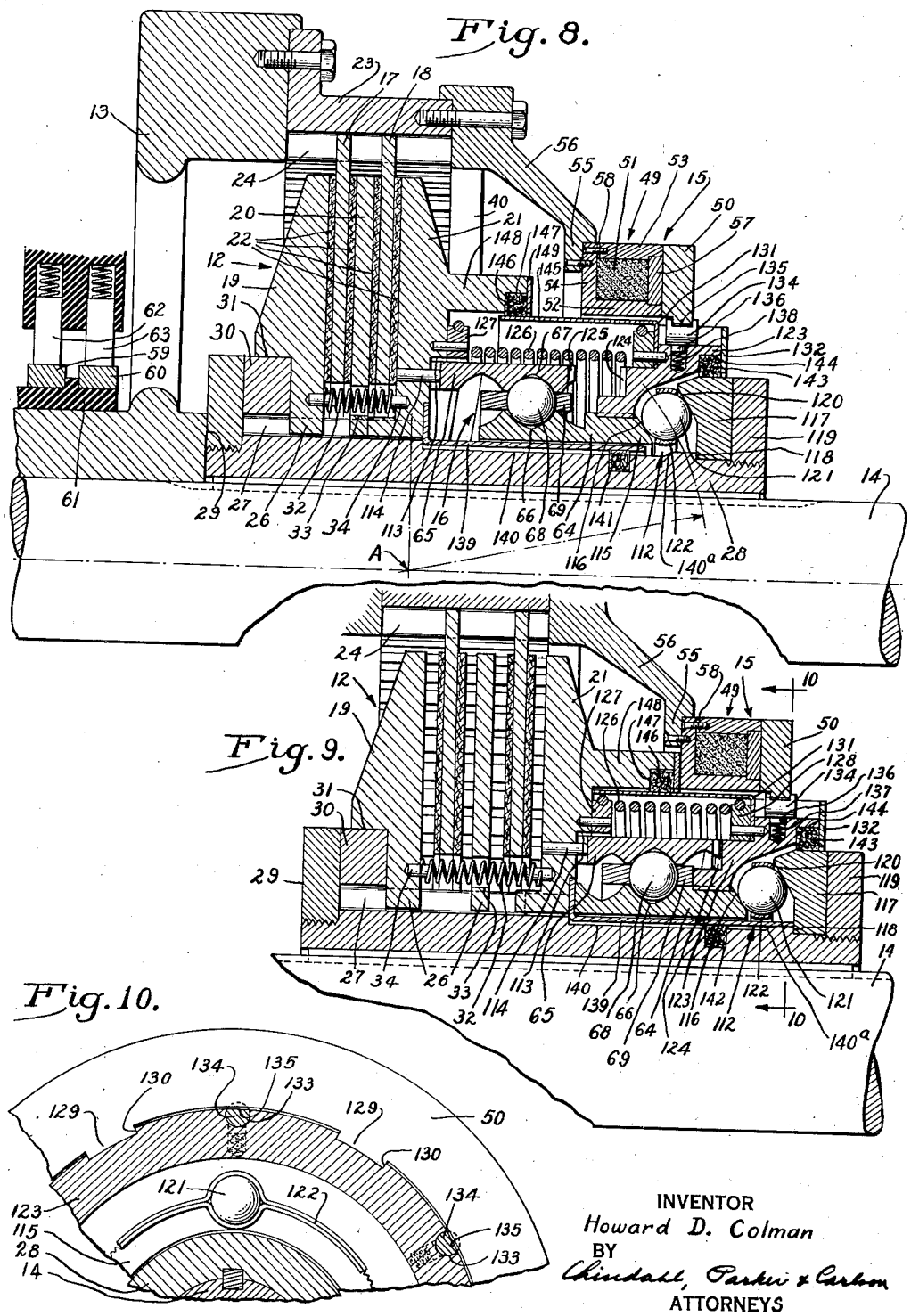
INVENTOR
Howard D. Colman
BY
Chindahl, Parker & Carlson
ATTORNEYS Patented Aug. 31, 1937

2,091,268

UNITED STATES PATENT OFFICE 2,091,268

CLUTCH MECHANISM

Howard D. Colman, Rockford, Ill.

Application March 5, 1934, Serial No. 714,168

27 Claims. (Cl. 192—40)

The present invention relates to a new and improved clutch mechanism adapted for general purposes.

The primary object of the invention is to provide a novel clutch mechanism having a main clutch and a pilot clutch, and a reversible screw device operable in one direction by the pilot clutch to exert a powerful closing pressure on the main clutch, and operable in the opposite direction under a comparatively light force to permit ready and complete opening of the main clutch when the pilot clutch is released.

A more specific object resides in the provision of a novel screw device in the foregoing combination which is simple and inexpensive in construction, which is sensitive, efficient and powerful in action, and which more particularly is substantially frictionless.

Another object is to provide a clutch mechanism of the foregoing character having a main clutch of the friction disk type, and having a self-centering axial thrust bearing located to react with the closing pressure exerted on the main clutch by the screw device, in which the bearing permits a universal wobbling or equalizing action of the clutch disks to compensate for irregularities in or uneven thicknesses of the individual clutch disks so as to obtain a uniform distribution of the load.

A further object resides in providing for a limited relative lateral floating movement between the main clutch and the pressure applying means so that any drunkenness in the bearing surfaces of the screw device and the end thrust bearing will not be capable of setting up strains tending to injure the parts of the screw device or to prevent a free and smooth operation thereof, thereby rendering it unnecessary to form such bearing surfaces with extreme precision at a heavy expense.

Another object is to provide novel means for preventing the escape of lubricant from the bearing surfaces of the screw device and the end thrust bearing.

A further object is to provide novel means for spacing the disks of the main clutch when the latter is open.

Other objects and advantages will become apparent as the description proceeds.

In the accompanying drawings, Figure 1 is a fragmentary axial sectional view of a clutch mechanism embodying the features of my invention.

Fig. 8 is a fragmentary axial sectional view illustrating a modified form of the invention.

Fig. 9 is a view similar to Fig. 8, but illustrating the main clutch in open position.

Fig. 10 is a fragmentary transverse sectional view taken along line 10—10 of Fig. 9.

Figure 1:
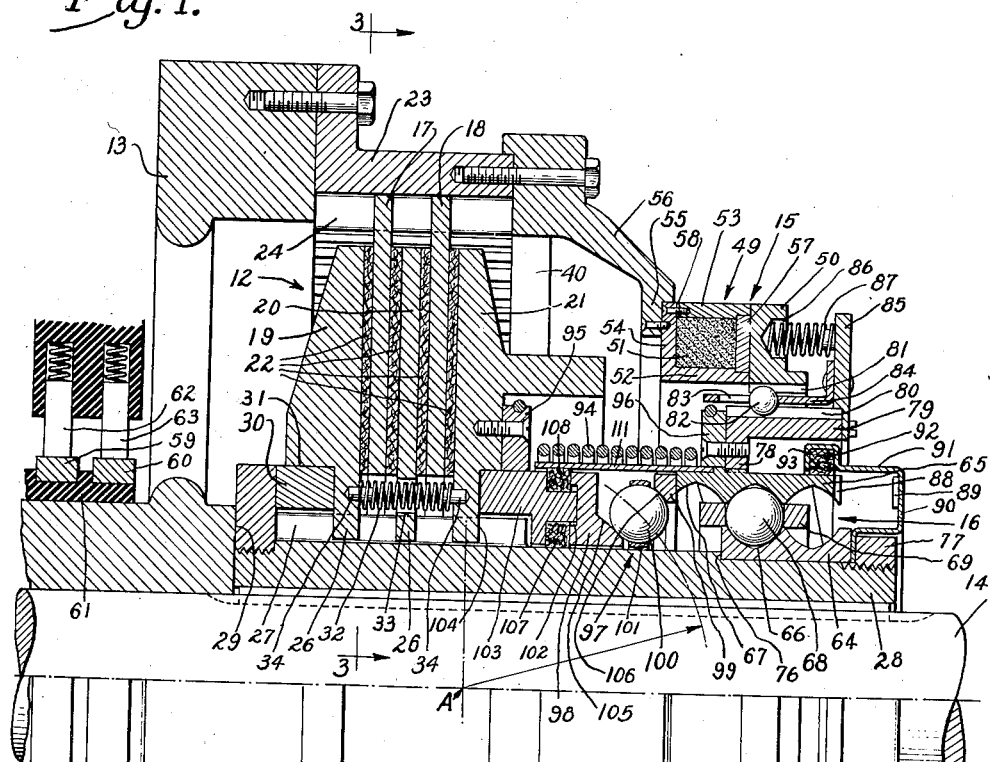
Figure 2:
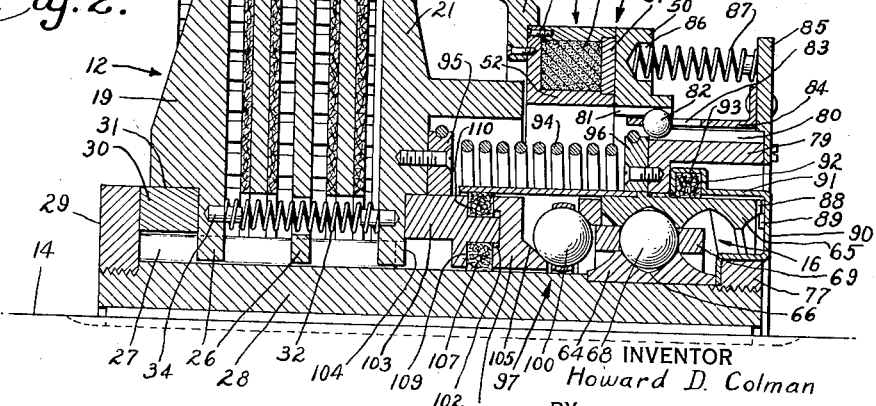
Fig. 2 is a view similar to Fig. 1, but showing the main clutch in open position.
Figure 3:
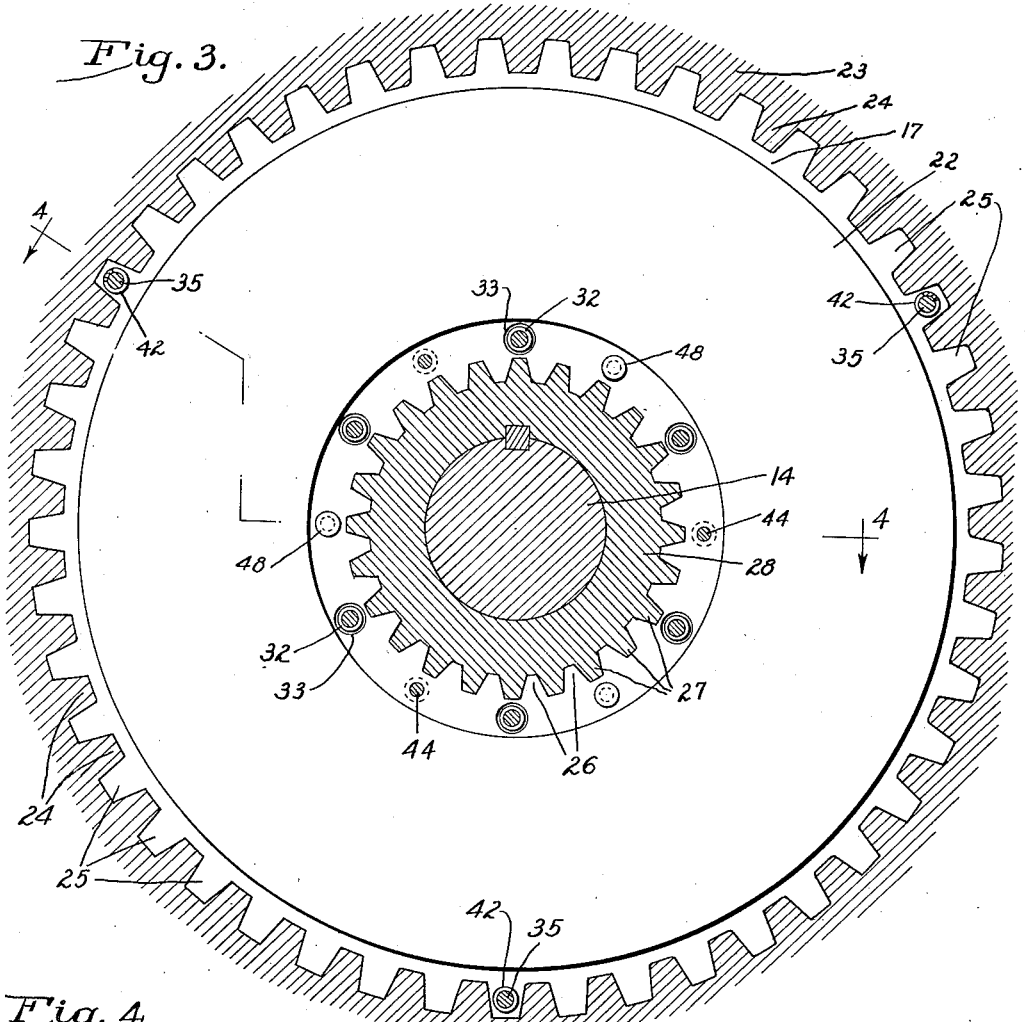
Fig. 3 is a fragmentary transverse sectional view taken substantially along line 3—3 of Fig. 1.
Figure 4:
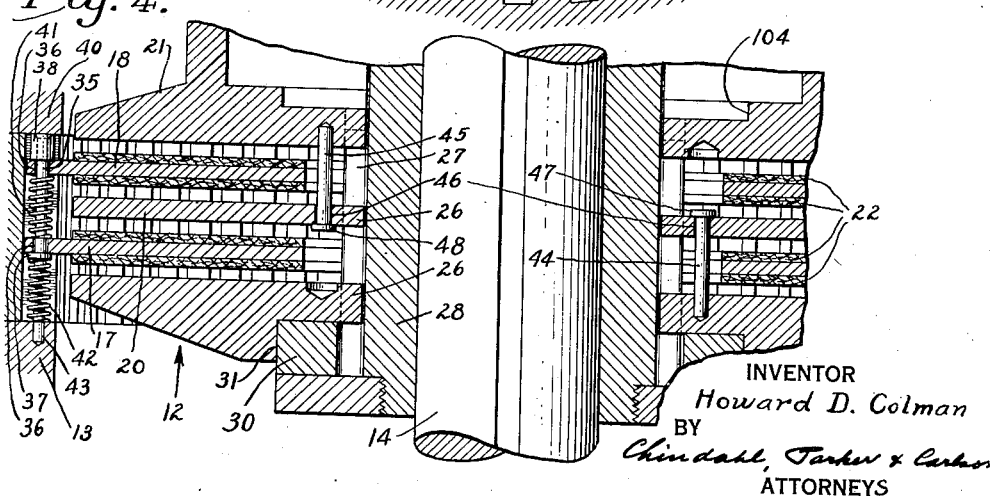
Fig. 4 is a fragmentary axial sectional view taken substantially along line 4—4 of Fig. 3.

Referring more particularly to the drawings, the clutch mechanism constituting the exemplary embodiment of the invention comprises a main clutch 12 for connecting a driving element 13 to a driven element 14, a pilot clutch 15 adapted when closed to be operated by the driving element, and an anti-friction screw device 16 operable by the pilot clutch to close the main clutch.

The driving and driven elements 13 and 14 may assume various forms depending on the different environments in which the clutch mechanism is to be utilized. In the present instance, the driven element 14 is shown as a shaft extending substantially through the clutch mechanism, and the driving element 13 consists of a pulley freely rotatable on the shaft, and adapted to be driven by a belt or gear (not shown) connected to a suitable source of power (not shown).

The main clutch 12 (see Figs. 1 to 4) may be provided in various forms, but is herein shown as of the twin disk type, comprising two parallel disks 17 and 18 connected to the pulley 13, and alternately arranged between three parallel disks 19, 20 and 21 connected to the shaft 14. Annular friction rings 22 are secured respectively to opposite sides of the disks 17 and 18. Peripherally enclosing the main clutch 12 is a ring 23 which is securely bolted to one side of the pulley 13 in concentric relation to the shaft 14, and which is formed internally with a plurality of uniformly peripherally spaced longitudinal splines 24. The disks 17 and 18 are formed in their outer peripheries with a plurality of teeth 25 which slidably interfit with the splines 24. Thus, the disks 17 and 18 have a rotary drive connection with the pulley 13, but are free for independent movement axially of the shaft 14. Similarly, the disks 19, 20 and 21 are formed internally with a plurality of uniformly peripherally spaced teeth 26 which slidably interfit with straight longitudinal splines 27 on the periphery of an elongated sleeve 28 keyed in a fixed axial position on the shaft 14. Hence, the disks 19, 20 and 21 have a rotary drive connection with the shaft 14, but are free for independent axial movement.

One end disk 19 normally is held against a fixed stop 29 on the sleeve 28 to limit the axial movement of the clutch assembly in one direction. Preferably, the stop 29 consists of a clamp nut threaded in fixed axial position on the inner end of the sleeve 28, and bearing against a spacer ring 30 seated in an annular groove 31 in the adjacent side face of the disk 19. The other end disk 21 constitutes a pressure disk which is movable axially to compress the disk assembly into frictional engagement.

A plurality of coiled compression springs 32 disposed in uniformly spaced relation about the sleeve 28 extend freely through openings 33 in the intermediate disk 20, and are seated at their opposite ends about suitable anchor pins 34 against the adjacent inner sides of the end disks 19 and 21. It will be evident that the springs 32 normally tend to separate the disk assembly to open the main clutch 12.

Means is provided for spacing the alternate clutch disks 17 to 21 uniformly apart to prevent any drag when the main clutch 12 is open. In its preferred form, this means (see Figs. 3 and 4) comprises a plurality of parallel uniformly spaced pins 35, three in the present instance, extending loosely through aligned openings 36 in the disks 17 and 18. Each pin 35 is provided with fixed longitudinally spaced collars 37 and 38 adapted for engagement with the remote sides of the disks 17 and 18 to determine the desired spacing of the latter. The collars 38 are riveted to the pins 35 in the assembly of the clutch 12, and are elongated to constitute stops adapted to abut against the inner side of an annular end plate 40 rigidly bolted to the free end of the ring 23. Coiled compression springs 41 are disposed respectively about the pins 35 and are in end abutment with the adjacent inner sides of the disks 17 and 18 to urge the latter apart into engagement with the collars 37 and 38. Similar coiled compression springs 42 are disposed in end abutment about suitable anchor pins 43 against the inner side of the pulley 13, and about the free inner ends of the pins 35 against the collars 37, and tend to urge the stops 38 against the ring 40 to locate the disks 17 and 18 as a unit in desired spaced relation to the disks 19 and 21.

A plurality of uniformly spaced and alternately arranged parallel pins 44 and 45 are anchored respectively in the adjacent inner sides of the end disks 19 and 21, and extend freely through openings 46 in the intermediate disk 20. Preferably, the pins 44 and 45 are provided respectively in sets of three, and are located successively between the springs 32. The free inner ends of the pins 44 and 45 are provided respectively with fixed heads 47 and 48 adapted for engagement respectively with the opposite sides of the intermediate disk 20 to locate the latter midway of the end disks 19 and 21.

When the end disk 21 is actuated to close the main clutch 12, the disks 17 to 21 are compressed into engagement against the action of the springs 32, 41 and 42. The springs 41 and 42, being provided merely for centering purposes, have an aggregate pressure which is small as compared to that of the main springs 32. When the end disk 21 is released to permit the springs 32 to open the main clutch 12, the springs 41 and 42, and the stops 38 through abutment with the inner side of the ring 40, act to space the disks 17 and 18, and to locate them as a unit midway of the disks 19 and 21, and the pins 44 and 45 act to locate the intermediate disk 20 midway of the disks 17 and 18. Obviously, the pins 44 and 45 also determine the maximum space between the disks 19 and 21.

The pilot clutch 15 preferably is of the electromagnetic type (see Figs. 1 and 2), in which an annular electromagnet 49 and an armature 50 are mounted concentrically about the shaft 14 for relative axial movement into and out of driving engagement, and which therefore constitute coacting friction clutch elements. One of these elements, for example the electromagnet 49, is mounted for rotation with the pulley 13, and the other element, i. e., the armature 50, is operatively connected to the screw device 16.

In its preferred form, the electromagnet 49 comprises an annular coil 51 which is secured between two inner and outer concentric rings 52 and 53 of magnetic material. The inner ring 52 is formed on one end with an outer peripheral flange 54 secured to the adjacent end of the ring 53, and also rigidly secured to a mounting ring 55 connected by a plurality of spaced spider arms 56 to the ring 40. A flat ring 57 of a suitable friction material is seated against the coil 51 between the free ends of the rings 52 and 53, and is substantially flush with the latter. It will be understood that the rings 52 and 53 constitute the pole pieces of the electromagnet 49, and with the flange 54 define a magnetic flux circuit adapted to be closed by the armature 50. Interposed between the ring 53 and the flange 54 is a thin ring 58 of non-magnetic material which interrupts the flux circuit so that when the coil 51 is deenergized, any residual magnetism present will be quickly and substantially dissipated.

Suitable slip rings 59 and 60 of electrical contact material are mounted on a support 61 of insulating material for rotation with the electromagnet 49, and are engaged by spring seated brush contacts 62 and 63 for completing the electric control circuit (not shown) for the coil 51.

Figure 5:
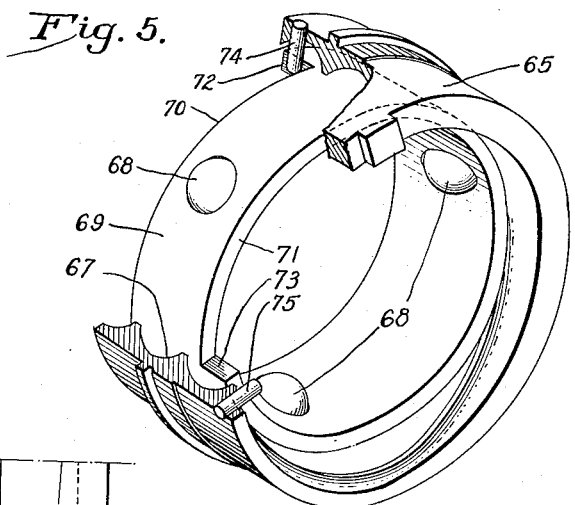
Fig. 5 is a fragmentary perspective view of a nut and ball retainer forming part of the anti-friction screw device.

The armature 50, upon rotation with the electromagnet 49, is operable through the action of the anti-friction screw device 16 to exert an axial thrust against the pressure disk 21 to close the main clutch 12. A screw 64 and a nut 65, formed respectively with complementary spiral threads defining interdental grooves or raceways 66 and 67, constitute the coacting members of the screw device 16 (see Figs. 1, 2 and 5). In the present instance, each of the screw members 64 and 65 is formed with a single raceway. Interposed between the raceways 66 and 67 and in bearing engagement therewith are a plurality of anti-friction balls 68. Preferably, three balls 68 are provided to obtain a uniform distribution of pressure, and the raceways 66 and 67 are made non-circular in axial section to provide a four point contact for each ball 68 when the screw device 16 is not under a heavy pressure. The balls 68 practically eliminate all friction in the screw device 16, and hence the latter will operate easily and smoothly in either direction to insure sensitive and efficient operation of the clutch mechanism.

Figure 7:
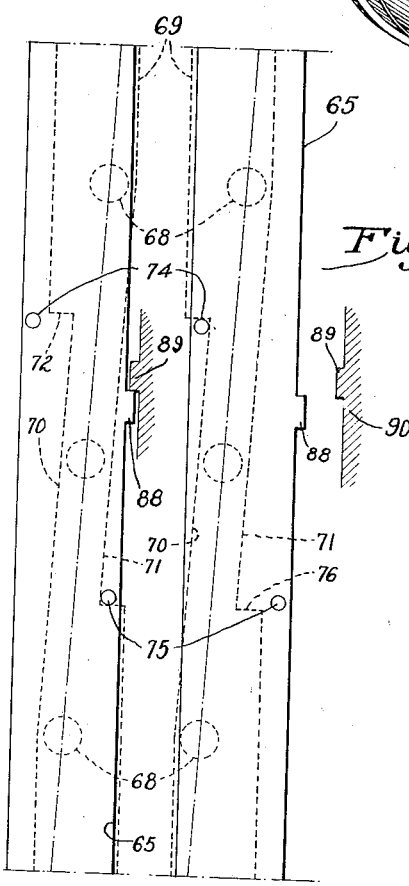
Fig. 7 represents two plan developments of the nut and ball retainer, illustrated in Fig. 5, in different positions of adjustment.
Figure 6:
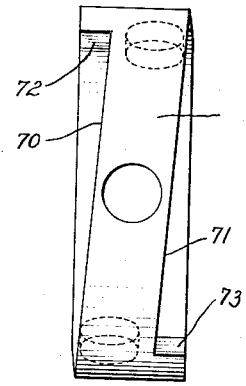
Fig. 6 is a side view of the ball retainer.

The balls 68 are held in spirally spaced relation by a suitable retainer ring or cage 69 (see Figs. 5 to 7) rotatably disposed between the screw 64 and the nut 65. To limit the rotation of the cage 69, so as to prevent the balls 68 from working out of the raceways 66 and 67, it is formed in opposite sides with oppositely inclined wedge shaped notches 70 and 71. The large ends of the notches 70 and 71 define opposed abutments 72 and 73 adapted, upon movement of the cage 69 into its extreme end positions, for engagement respectively with pins 74 and 75 extending inwardly from the nut 65. The range of movement is sufficient to permit free rolling of the balls 68 in the normal operation of the screw device 16.

The screw device 16 may be provided in various forms. Thus, either one of the screw members 64 and 65 may be constrained for positive rotation with the sleeve 28 on the driven shaft 14, while the other member is rotatable relatively thereto. In each instance, the armature 50 is connected for rotation with the rotatable member. More particularly, in one form of the invention illustrated in Figs. 1 to 7, the screw 64 is fixed on the outer end of the sleeve 28, and in the alternative form shown in Figs. 8 to 10, the nut 65 is connected for rotation with the pressure disk 21. The parts thus far described are common to both forms, and hence are identified therein by the same reference characters.

Referring first to Figs. 1 to 7, the screw 64 is secured in position against a peripheral shoulder 76 on the sleeve 28 by means of a clamp nut 77, and the nut 65 of the screw device 16 is rotatable relatively thereto. Rigidly splined on an intermediate portion of the nut 65 for movement therewith is a carrier member for the armature 50. Preferably, the carrier member is provided in the form of a ring 78 having an annular flange 79 extending in concentrically spaced relation about the outer end of the nut 65. The armature 50 is splined for relative axial movement on and for rotation with the flange 79.

Since the flange 79 is fixed on the axially movable member of the screw device 16, i. e., the nut 65, in this form of the invention, it has a substantially greater range of axial movement than would be permissible for the armature 50. Provision is therefore made to eliminate practically all friction in the spline connection between the armature 50 and the flange 79 to insure sensitive operation of the pilot clutch 15 and the screw device 16. Preferably, the spline connection comprises a plurality of uniformly spaced longitudinal spline grooves 80, for example two diametrically spaced grooves, constituting raceways in the outer periphery of the flange 79, similar grooves or raceways 81 in the inner periphery of the armature 50, and a plurality of balls 82 respectively disposed in bearing engagement with the different sets of coacting raceways 80 and 81. The balls 82 are confined for a limited range of rolling movement in a like number of slots 83 formed in retainer arms 84 between the armature 50 and the flange 79. These arms 84 are secured to the inner side of an annular plate 85 which is secured to the outer end of the flange 79 for movement therewith. Engaging in recesses 86 in the outer face of the armature 50 and abutting against the plate 85 are a plurality of annularly spaced springs 87 which tend to urge the armature into engagement with the electromagnet 49.

The armature 50 is held constantly in engagement with the electromagnet 49, and hence no appreciable air gap need be overcome to close the pilot clutch 15. When the electromagnet 49 is deenergized, the engagement under the influence of the springs 87 is light so that no substantial drag or torque on the armature 50 is exerted, and hence the pilot clutch 15 in effect is open. As a result, the nut 65 of the screw device 16 occupies an initial position (see Figs. 2 and 7) in which it permits the main clutch 12 to open. This position is defined by two limit stops 88 and 89 which are fixed respectively on the outer end of the nut 65 and in an annular housing 90 secured between the screws 64 and the clamp nut 77, and which are adapted upon engagement to prevent further rotation of the nut 65 in a backward direction.

The housing 90 has a cylindrical sleeve 91 extending into the flange 79, and adapted to receive the outer end of the nut 65. An oil seal ring 92 is secured in an annular groove 93 formed in the inner end of the sleeve 91, and embraces the nut 65 to prevent the escape of lubricant from the outer end of the screw device 16.

When the electromagnet 49 is energized, the armature 50 is attracted with greatly increased pressure, thereby in effect closing the pilot clutch 15, and thereupon is rotated against the action of a coiled torsion spring 94 fixed at its opposite ends to two anchor rings 95 and 96 bolted respectively to the clutch disk 21 and the ring 78. Upon rotation of the armature 50 relative to the screw 64, the nut 65 is threaded along the latter away from the limit stop 89 (see Figs. 1 and 7) and the axial inward movement of the nut is transmitted through a thrust bearing 97 against the clutch disk 21 to close the main clutch 12. All of the parts of the clutch mechanism then rotate as a unit. It will be understood that the main clutch springs 32 and the torsion spring 94 will return the nut 65 to initial position when the pilot clutch 15 again is opened. Where the guideways 66 and 67 are formed with a steep lead, the spring 94 may be dispensed with.

The bearing 97 in its preferred form comprises two thrust collars 98 and 99, and a plurality of balls 100 interposed therebetween. The balls 100 are held uniformly spaced in a common transverse plane by a retainer 101. The outermost collar 99 is rigidly secured to the inner end of the nut 65, and the other collar 98 is formed in the face opposite the clutch disk 21 with a flat annular groove 102. A thrust sleeve 103 within the spring anchor ring 95 is seated at one end in an annular notch 104 formed in the adjacent inner peripheral edge of the clutch disk 21, and bears at its other end in the groove 102.

The end thrust bearing 97 is adapted to permit self-adjustment of the clutch disk 21 when pressure is applied to compensate for any inequalities in the clutch disks 17 to 21, and thereby insure a uniform peripheral distribution of pressure. This self-equalizing action is desirable since the individual clutch disks 17 to 21 may not be of uniform thickness when new, due to manufacturing inaccuracies, and may wear unevenly in use, and since if it were not provided, certain of the balls 68 and portions of the raceways 66 and 67 might be required to carry most of the load, and therefore might be subjected to excessive strains. In the present instance, the equalizing or wobbling action is obtained by providing the collars 98 and 99 respectively with concave and convex partial spherical bearing surfaces 105 and 106 having a common center A coincident with the axial center of the medial plane of the clutch disk 21.

Because of the provision of three balls 68 in the screw device 16, the raceways 66 and 67 need not be formed with extreme precision, as would be necessary if more balls were employed, in order to obtain a uniform distribution of pressure. Hence, expensive machining operations, such as grinding, can be dispensed with, so that a very considerable saving in the cost of manufacture is possible.

The screw device 16, since it is simple in construction, powerful, and substantially frictionless, constitutes a very efficient and desirable operative connection between the pilot and main clutches 15 and 12. For maximum effectiveness, the screw device 16 should operate freely and smoothly. Therefore, to avoid any strain tending to interfere with the operation of the screw device 16, which might otherwise result if the raceways 66 and 67 or the bearing surfaces 105 and 106 should be slightly drunk due to manufacturing inaccuracies, the thrust collar 98 is permitted a limited lateral floating movement relative to the clutch disk 21. In the present instance, this is accomplished by making the groove 102 slightly less in inside diameter and greater in outside diameter than the contacting end of the sleeve 103. The screw device 16 operates under comparatively little end pressure during most of the closing movement of the clutch disks 17 to 21. In this period, during which the cumulative error in the raceways 66 and 67 is likely to be the most pronounced, comparatively little friction will develop between the bearing surfaces of the collar 98 and the sleeve 103 because of the light pressure and the presence of a certain amount of lubricant, and hence the floating connection readily compensates for any error, thereby preventing an uneven distribution of the load and an excessive strain on certain of the balls 68 and portions of the raceways 66 and 67. It is only during the very small final movement of the nut 65 that the closing pressure on the main clutch 12 becomes heavy, and during this period, the relative rotation between the screw 64 and the nut is so small that the effect of any drunkenness in the raceways 66 and 67 is very slight and not in need of correction. However, if desired, an anti-friction ball or roller end thrust bearing (not shown) may be placed between the collar 98 and the sleeve 103.

An oil seal is provided for preventing the escape of lubricant from the end thrust bearing 97 to the friction surfaces of the main and pilot clutches 12 and 15. Preferably, this seal comprises two seal rings 107 and 108 positioned respectively within inner and outer notches 109 and 110 formed in the sleeve 103. The inner ring 107 bears against the sleeve 28, and prevents the escape of lubricant along the latter to the main clutch 12. The outer ring 108 engages the inner peripheral surface of a cylindrical sleeve or guard 111 which extends axially through the spring 94 and is tightly secured at one end to the adjacent end of the nut 65, and which serves to enclose the outer periphery of the end thrust bearing 97.

Referring now to the modified form of the invention illustrated in Figs. 8 to 10, the screw 64 is freely rotatable in a fixed axial position against an end thrust bearing 112 on the outer end of the sleeve 28, and the nut 65 bears at one end directly against the clutch disk 21. Preferably, the nut 65 extends loosely into an inner peripheral notch 113 formed in the outer side of the plate 21, and is held against rotation therein by a spline pin 114.

The thrust bearing 112 comprises an inner collar 115 rigid with the screw 64 and having an annular bearing surface 116, an outer collar 117 secured in a notch 118 in the outer end of the sleeve 28 by a clamp nut 119 and having an opposed bearing surface 120, and a plurality of balls 121 held in uniformly spaced relation by a retainer 122 between the bearing surfaces 116 and 120. As in the first form, the bearing surfaces 116 and 120 are respectively spherically convex and concave about a common center A coincident with the axial center of the plane of the end plate 21, thereby permitting a slight universal wobble or equalizing motion of the latter to compensate for unevenness in the individual disks 17 to 21 of the main clutch 12.

To prevent drunkenness in the raceways 66 and 67 or in the bearing surfaces 116 and 120 from setting up any strains tending to bind the screw device 16, the notch 113 is formed somewhat larger in diameter than the nut 65, and hence permits a limited lateral floating movement between the latter and the clutch disk 21.

Secured to the outer end of the screw 64 for movement therewith is an annular carrier member 123 for the armature 50. The carrier member 123 also is formed with a stop 124 adapted to coact with a stop 125 on the outer end of the nut 65 to limit the outward movement of the latter when the main clutch 12 is open. A coiled torsion spring 126 fixed at its opposite ends respectively to two anchor rings 127 and 128 on the clutch disk 21 and the carrier member 123 tends to rotate the screw 64 in a direction to thread the nut 65 outwardly until the stops 124 and 125 are in engagement.

The armature 50 is splined on and about the outer periphery of the carrier member 123 for axial movement toward and from the electromagnet 49. Preferably, the spline connection (see Fig. 10) consists of a plurality of slidably interfitting keys 129 and keyways 130 formed respectively in the inner periphery of the armature 50 and the outer periphery of the member 123. Suitable end plates 131 and 132 secured to opposite sides of the member 123 serve to close the ends of the keyways 130 to prevent unwarranted removal of the armature 50. Since the armature 50 is not mounted on the axially movable member of the screw device 16, i. e., the nut 65, its axial movement relative to the carrier member 123 is slight. Hence, it is not pressed constantly against the electromagnet 49 by yieldable means, as in the first form, but has a limited free axial floating movement.

Also formed in and opening through the carrier member 123 between the respective keyways 130 are a plurality of transverse bores 133. These bores are so located that they intersect the outer peripheral surface of the member 123, but that their axes fall substantially inside of the surface. A plurality of pins 134 are slidably disposed respectively in the bores 133. Each of the pins 134 is formed intermediate its ends with a longitudinal notch 135 which receives the inner periphery of the armature 50. The notches 135 are slightly greater in length than the thickness of the armature 50 to permit a limited axial play of the latter. Preferably, this difference is slightly greater than the sum of the maximum end plays of the aligned driving and driven members 13 and 14.

A plurality of friction plungers 136 are slidably mounted respectively in a series of radial bores 137, formed in the carrier member 123 and opening outwardly into the inner sides of the bores 133. The plungers 136 are spring pressed outwardly against the sides of the pins 134 by compression springs 138 to exert a frictional drag resisting axial adjustment of the pins 134.

It will be evident that the ends of the notches 135 limit the extent of movement of the armature 50 relative to the electromagnet 49, and therefore the maximum size of the air gap possible therebetween. In the event of wear on the electromagnet 49, the closing movement of the armature 50 will effect a compensating adjustment of the pins 134 against the action of the friction plungers 136.

The screw device 16 and end thrust bearing 112 are sealed against the escape of lubricant. Thus, at one end, a cylindrical guard 139 tightly secured to the clutch disk 21 extends into the central bore of the screw 64 and is movable in a peripheral space 140 in the sleeve 28. The free end of the guard bears internally against an oil seal 141 seated in an annular groove 142 in the peripheral wall of the space 140, and is adapted to ride over a cam shoulder 140a into telescoping engagement with the sleeve 28 when the clutch 12 is opened, thereby insuring parallelism between the disk 21 and the armature 50 when the pilot clutch 15 is released. At the other end, the carrier member 123 is of irregular conical form, and flares outwardly about the collar 117, thereby substantially enclosing the ball space of the end thrust bearing 112. An oil seal ring 143 is held in an annular notch 144 in the outer end of the carrier member 123 by the plate 132, and bears against the outer periphery of the collar 117. At the periphery a cylindrical guard 145, rigid with the plate 131, extends inwardly from the carrier member 123 about the spring 126. An oil seal ring 146 is secured within an inner peripheral notch 147 in the outer end of an annular flange 148 on the clutch disk 21 by a retainer ring 149, and bears against the outer periphery of the free end of the guard 145.

The operation of both forms of the invention will be evident from the foregoing description, and briefly summarized is as follows:

When the electromagnet 49 is energized, the pilot clutch 15 is closed to rotate the armature 50 with the driving member 13. The armature 50 rotates the nut 65, in Fig. 1, to advance it axially away from the limit stop 89, and thereby to transmit endwise pressure through the bearing 97 against the clutch disk 21 to close the main clutch 12. In Fig. 8, the nut 65 is advanced by rotating the screw 64, and the closing pressure applied to the clutch 12 reacts against the bearing 112. In both forms, the respective end thrust bearings 97 and 112 permit a universal rocking motion of the clutch disk 21 to compensate for irregularities in the clutch disks 17 to 21, and thereby to insure an equal distribution of the load on the balls 68. The keys 129 and keyways 130 have a loose fit to permit this adjustment. The clutch disk 21 has a limited lateral floating movement relative to the screw device 16 to compensate for any drunkenness in the raceways 66 and 67, and in the bearing surfaces of the end thrust bearing, during most of the movement of the nut 65, thereby preventing injury to or binding of the operating parts of the screw device.

When the electromagnet 49 is deenergized, the screw device 16, by reason of its free-rolling characteristics, reverses in operation under the action of the clutch springs 32 and also the torsion spring (when the latter is provided) to return the nut 65 into its initial limit position, thereby permitting the main clutch 12 to open. In the opening movement of the main clutch 12, the disks 17 to 21 are automatically separated into substantially uniformly spaced relation.

The escape of lubricant from the screw device 16 and the end thrust bearing to the friction surfaces of the main and pilot clutches 12 and 15 is effectively prevented.

It will be evident that I have provided a novel clutch mechanism which is simple and inexpensive in construction, and powerful, reliable and sensitive in operation. The pilot clutch 15 is adjusted automatically to compensate for wear on the friction surfaces. The anti-friction screw device 16 is of particular advantage in the clutch environment herein disclosed because of its free-rolling characteristics, its powerful action under the influence of comparatively light forces, and its ready operation in a reverse direction under the influence of an axial thrust. These characteristics of the screw device 16 permit the use of a comparatively light pilot clutch having a small electromagnet and requiring a low exciting current, and insure a uniform clutch pressure for a given current input. It is to be understood that although the pilot clutch 15 is illustrated as of the electromagnetic type, it may, within the broad aspects of the invention, also be mechanical in form.

I claim as my invention:

1. A clutch mechanism comprising, in combination, a drive shaft, a driven shaft, a main clutch having driving and driven elements connected positively for rotation respectively to said shafts and adapted for relative axial movement into and out of driving engagement and spring means tending to separate said elements, a screw device having coacting screw and nut members mounted for relative rotation and axial movement in opposite directions respectively to close or permit the opening of said clutch, and having anti-friction rollers disposed between said members to complete the thread relationship one of said members being connected positively for rotation with said driven shaft and being anchored against endwise movement in one direction to oppose the closing pressure of said clutch, means for limiting the axial movement of the other of said members in said one direction to define its idle position, and a pilot clutch for operating said screw device, said pilot clutch having a driving element connected positively for rotation with said drive shaft and having a driven element connected positively for rotation with said other of said members.

2. A clutch mechanism comprising, in combination, a main clutch having driving and driven elements adapted for relative axial movement into and out of driving engagement, a screw device axially aligned with said main clutch and having coacting screw and nut members mounted for relative rotation, with one member anchored against axial movement and the other member movable axially out of a normal idle position to actuate said clutch, an annual pilot clutch located about said device and having a driving element rigidly connected with the driving element of said main clutch and having a driven element splined to one of said members for free axial movement thereon and for rotation therewith, and a torsion spring located within the annulus of said pilot clutch and resisting rotation of said one member in one direction.

3. A clutch mechanism comprising, in combination, a main clutch having driving and driven elements adapted for relative axial movement into and out of driving engagement and spring means tending to separate said elements, a screw device having coacting screw and nut members mounted for relative rotation with one member anchored against axial movement and the other member movable axially out of a normal idle position to exert an axial closing thrust on said clutch and having anti-friction rollers disposed between said members to complete the thread relationship, and an electromagnetic pilot clutch for rotating one of said members, said other member being oppositely movable into said idle position in response to said spring means when said pilot clutch is released.

4. A clutch mechanism comprising, in combination, a drive shaft, a driven shaft, a main clutch having driving and driven elements connected positively for rotation respectively to said shafts and adapted for relative axial movement into and out of driving engagement and spring means tending to separate said elements, a screw device having coacting screw and nut members of which said screw member is connected positively for rotation with said driven shaft and is anchored against axial movement and said nut member is rotatable on said screw member for axial movement out of a normal idle position to exert an axial closing thrust on said clutch elements and having anti-friction rollers disposed between said members to complete the thread relationship, and a pilot clutch having a driving element connected positively for rotation with said drive shaft and having a driven element connected positively for rotation with said nut member to close said main clutch, said nut member when said pilot clutch is released being automatically operable in a reverse direction into said idle position to permit opening of said main clutch.

5. A clutch mechanism comprising, in combination, a main clutch having driving and driven elements adapted for relative axial movement into and out of driving engagement and spring means tending to separate said elements, a screw device having coacting screw and nut members of which said screw member is anchored against axial movement in one direction and is rotatable in said nut member to advance said nut member axially out of a normal idle position to exert an axial closing thrust on said clutch elements and having anti-friction rollers disposed between said members to complete the thread relationship, and an electromagnetic pilot clutch for rotating said screw member, said screw device being automatically operable in a reverse direction to return said nut member to said idle position when said pilot clutch is released.

6. A clutch mechanism for connecting coaxial driving and driven rotary members and comprising, in combination, a main clutch having driving and driven friction elements adapted for axial movement into and out of driving engagement and connected for rotation respectively with said members, and having spring means tending to separate said elements, one end element constituting an actuator movable axially to compress or release said elements, a screw device having a screw anchored against endwise movement and rotation on said driven member and a nut rotatable on said screw for axial movement into and out of a normal idle position, three spaced balls in bearing engagement with the threads of of said screw and nut, an end thrust bearing having spaced collars which have opposed bearing faces with a plurality of balls interposed therebetween, and which react respectively against said nut and actuator, a thrust sleeve interposed between said actuator and the adjacent collar and having a limited universal lateral floating movement relative thereto, said bearing faces being spherically concentric relative to an axial center in the plane of said actuator, a pilot clutch having driving and driven elements movable axially into and out of driving engagement and with the driving element connected for rotation with said first mentioned driving element and the driven element connected for rotation with said nut, and torsion spring means tending to rotate said nut into said idle position.

7. A clutch mechanism for connecting coaxial driving and driven rotary members and comprising, in combination, a main clutch having driving and driven friction elements adapted for axial movement into and out of driving engagement and connected for rotation respectively with said members, a screw device having a screw anchored against endwise movement and rotation on said driven member and a nut rotatable on said screw for axial movement into and out of a normal idle position, three spaced balls in bearing engagement with the threads of said screw and nut, an end thrust bearing having spaced collars which have opposed bearing faces with a plurality of balls interposed therebetween, and which react respectively against said clutch and said nut and have a limited lateral floating movement relative to said clutch, said bearing faces being spherically concentric relative to an axial center in the plane of one outer element, and a pilot clutch having driving and driven members movable axially into and out of driving engagement and with the driving element connected for rotation with said first mentioned driving element, and the driven element connected for rotation with said nut.

8. A clutch mechanism for connecting coaxial driving and driven rotary members and comprising, in combination, a main clutch having driving and driven friction elements adapted for axial movement into and out of driving engagement and connected for rotation respectively with said members, a screw device having a screw rotatable on said driven member and a nut secured for rotation with and reacting axially against said clutch, said nut having a limited universal lateral floating movement relative to said clutch, a plurality of spaced balls in excess of two in bearing engagement with the threads of said screw and nut, an end thrust bearing having axially spaced collars which have opposed bearing faces with a plurality of balls interposed therebetween, and which react respectively against said driven member and said screw, said bearing faces being spherically concentric relative to an axial center in the plane of one outer element, and a pilot clutch having a driving element rotatable with said first mentioned driving element and a driven element rotatable with said screw.

9. A clutch mechanism for connecting coaxial driving and driven rotary members and comprising, in combination, a main clutch having driving and driven friction elements adapted for axial movement into and out of driving engagement and connected for rotation respectively with said members, and having spring means tending to separate said elements, one end element constituting an actuator movable axially to compress or release said elements, a screw device having a screw rotatable on said driven member and a nut secured for rotation with and reacting axially against said actuator, said nut having a limited universal lateral floating movement relative to said actuator, a plurality of spaced balls in excess of two in bearing engagement with the threads of said screw and nut, an end thrust bearing having axially spaced collars which have opposed bearing faces with a plurality of balls interposed therebetween, and which react respectively against said driven element and the outer end of said screw remote from said clutch, said bearing faces being spherically concentric relative to an axial center in the plane of said actuator, a pilot clutch having a driving element rotatable with said first mentioned driving element and a driven element rotatable with said screw, and torsion spring means tending to rotate said screw to return said nut axially into a normal idle position.

10. A clutch mechanism comprising, in combination, a driving element and a coaxial driven element, a plurality of driving and driven clutch disks splined for axial movement respectively on said elements, an axial abutment on one of said elements and adapted for engagement with one end disk, an axially extensible rotary power multiplying device concentric with said elements and coacting with the other end disk for compressing said disks against said abutment into driving engagement, said other end disk having a self-aligning universal connection with said device, and means for actuating said device.

11. A clutch mechanism comprising, in combination, a driving element and a driven element, a plurality of driving and driven clutch disks splined for axial movement respectively on said elements, two spaced axial stops on one of said elements at opposite sides of said disks, an axially extensible and contractable power multiplying device rotatable about the axis of said elements and bearing at one end against one of said stops and coacting at the other end with the adjacent end disk, and means for actuating said device to compress said disks against the other of said stops into driving engagement, said end disk having a lateral floating connection with said device and being free for a universal self-aligning angular adjustment relative to said one stop.

12. A clutch mechanism comprising, in combination with coaxial driving and driven members, a main clutch for connecting said members, a screw and nut device having coacting threaded elements adapted for relative rotation and a resulting endwise adjustment, means for constraining one of said elements against endwise movement, the other of said elements coacting axially with said clutch and being operative upon elongation of said device to close said clutch, a plurality of peripherally spaced balls between and in bearing engagement with said elements, a retainer for said balls rotatable between said elements, means on one of said elements for limiting the degree of rotation of said retainer, and means for effecting relative rotation between said elements.

13. A clutch mechanism comprising, in combination with coaxial driving and driven members, a clutch element having an electromagnet and connected for rotation with one of said members, a second clutch element having an armature connected for rotation with the other of said members, said electromagnet and said armature being mounted for relative axial movement into and out of holding relation, and means for limiting the maximum permissible range of relative axial movement between said electromagnet and said armature and being self adjustable in response to the approaching movement therebetween to maintain said range substantially constant regardless of wear on said elements.

14. A clutch mechanism for connecting a driving member and a coaxial driven member, comprising, in combination, an annular housing with parallel end plates rotatable with said driving member, a plurality of driven friction disks, including two end disks and an intermediate disk, splined for axial movement on said driven member, spring means tending to separate said end disks, stop means on said driven member for limiting outward movement of one of said end disks, means for moving the other of said end disks toward said one end disk, two pins carried respectively by said end disks and respectively having oppositely facing shoulders adapted for engagement with opposite sides of said intermediate disk in the separating movement of said end disks to locate said disks in predetermined spaced relation when separated, two driving friction disks splined for axial movement to said housing between said end plates and disposed alternately between said driven disks, spring means tending to separate said driving disks, a plurality of pins extending slidably through said driving disks and each having two oppositely facing shoulders adapted for engagement by the outer sides of said driving disks to locate said driving disks in predetermined spaced relation when separated, said last mentioned pins being adapted for end abutment with one of said end plates to locate said driving disks as a unit in predetermined spaced relation to said end disks, and spring means seated against said other end plate and tending to urge said last mentioned pins toward said one end plate.

15. A clutch mechanism for connecting a driving member and a coaxial driven member, comprising in combination, an annular housing with parallel end plates rotatable with said driving member, a plurality of friction disks, including two end disks and an intermediate disk, splined for axial movement on one of said members, spring means tending to separate said end disks, stop means on said one member for limiting outward movement of one of said end disks, means for moving the other of said end disks toward said one end disk, two pins carried respectively by said end disks and respectively having oppositely facing shoulders adapted for engagement with opposite sides of said intermediate disk in the separating movement of said end disks to locate said disks in predetermined spaced relation when separated, two friction disks splined for axial movement on the other of said members between said end plates and disposed alternately between said first mentioned disks, spring means tending to separate said last mentioned disks, a pin extending slidably through said last mentioned disks and having two oppositely facing shoulders adapted for engagement by the outer sides of said last mentioned disks to locate them in predetermined spaced relation when separated, said last mentioned pin being adapted for end abutment with one of said end plates to locate said last mentioned disks as a unit in predetermined spaced relation to said end disks, and spring means seated against said other end plate and tending to urge said last mentioned pin toward said one end plate.

16. A clutch mechanism for connecting a driving member and a coaxial driven member, comprising in combination, two flat annular friction disks splined for axial movement on one of said members, spring means tending to separate said disks, stop means on said one member for limiting outward movement of one of said disks, coaxial power multiplying means for moving the other of said disks toward said one disk, means independent of said power multiplying means and operable in the separating movement of said disks to locate said disks in predetermined spaced relation when separated, a third friction disk splined for axial movement on the other of said members and located between said first mentioned disks, and means tending to locate said third disk in spaced relation to said first mentioned disks.

17. A clutch mechanism comprising, in combination, a main clutch, a ball bearing screw and nut device axially extensible and contractible upon rotary operation to effect actuation of said clutch in opposite directions, a self-centering end thrust ball bearing reacting axially with said clutch and said device, oil seal means for enclosing the ball spaces of said device and said bearing against the escape of lubricant, and means for operating said device.

18. A clutch mechanism comprising, in combination, a clutch, a ball bearing screw and nut device axially extensible and contractable upon rotary operation to effect actuation of said clutch, a self-centering end thrust ball bearing reacting axially with said clutch and said device, and means for operating said device.

19. A clutch mechanism comprising, in combination, a main clutch having coacting elements moving axially into and out of engagement, a ball bearing screw and nut device axially extensible and contractable upon rotary operation in opposite directions, and operable in one direction of rotation to effect engagement of said clutch, a self-centering end thrust ball bearing reacting axially with said clutch and said device and permitting self adjustment of said elements to effect a uniform peripheral distribution of pressure therebetween when said clutch is engaged, and a pilot clutch for operating said device.

20. A clutch mechanism comprising, in combination, a clutch having driving and driven elements adapted for relative movement into and out of engagement, spring means tending to actuate said elements in one direction, a screw device having a nut and a screw mounted for relative rotation and relative axial movement in opposite directions in the opening and closing of said clutch and having exactly three peripherally spaced balls disposed therebetween to complete the thread relationship, and means for operating said device to actuate said elements against the force of said spring means.

21. A clutch mechanism comprising, in combination, a clutch having driving and driven elements adapted for relative movement into and out of engagement, spring means tending to actuate said elements in one direction, a screw device having a nut and a screw mounted for relative rotation and relative axial movement in opposite directions in the opening and closing of said clutch and having a plurality of anti-friction rollers disposed therebetween to complete the thread relationship, a rotatable cage for supporting said rollers in predetermined spaced relation in position between said nut and said screw, the threads of said nut and screw having elliptical sides to provide point contacts with said rollers and defining roots spaced from said rollers, and means for operating said device to actuate said elements against the force of said spring means.

22. A clutch mechanism comprising, in combination, a clutch having driving and driven elements adapted for relative movement into and out of engagement, spring means tending to actuate said elements in one direction, a screw device having a nut and a screw mounted for relative rotation and relative axial movement in opposite directions in the opening and closing of said clutch and having exactly three anti-friction rollers disposed therebetween to complete the thread relationship, an annular retainer interposed between said nut and screw for holding said rollers 120 degrees apart, and means for operating said device to actuate said elements against the force of said spring means.

23. A clutch mechanism comprising, in combination, a clutch having driving and driven elements adapted for relative movement into and out of engagement, spring means tending to actuate said elements in one direction, a screw device having a screw fixed against axial movement and a coacting nut rotatable on and movable axially in opposite directions along said screw in the closing and opening of said clutch and having anti-friction rollers disposed therebetween to complete the thread relationship, an axially fixed stop, means on said stop and one end of said nut movable into interlocking engagement to define one extreme end position of said nut, a retainer for holding said rollers in spaced relation and permitting rolling of said rollers in the threads of said screw and nut, means for limiting the extent of movement of said retainer to confine said rollers between said threads, and means for rotating said nut out of said end position against the force of said spring means.

24. A clutch mechanism comprising, in combination, a clutch having driving and driven elements adapted for relative movement into and out of engagement, spring means tending to actuate said elements in one direction, a screw device having coacting screw and nut members mounted for relative rotation and axial movement in opposite directions in the opening and closing of said clutch and having anti-friction rollers disposed therebetween to complete the thread relationship, a lateral floating connection between said device and said clutch, a self-centering end thrust ball bearing reacting axially with said clutch and said device, and means for operating said device against the action of said spring means.

25. In a clutch mechanism, in combination with coaxial driving and driven members, an annular electromagnet rotatable with one of said members, an annular armature having a ball bearing spline connection with the other of said members for movement axially of said electromagnet, and spring means for urging said armature with a light pressure into direct end face engagement with said electromagnet, said electromagnet upon energization being adapted to attract said armature with a sufficient force supplementing the force of said spring means to effect a frictional driving connection between said members.

26. In a clutch mechanism, in combination with coaxial driving and driven members, a clutch element having an electromagnet and connected for rotation with one of said members, a second clutch element having an armature connected for rotation with the other of said members, one of said elements being splined for axial movement on its supporting member so that said electromagnet and said armature are movable relatively into and out of holding relation, a block mounted in said supporting member for sliding movement in a direction parallel to the axis of said members and having a notch loosely receiving and permitting a limited degree of independent axial movement of said splined element, and means for imparting a friction drag to said block.

27. In a clutch mechanism, in combination with coaxial driving and driven members, a clutch element having an electromagnet and connected for rotation with one of said members, a disk fixed for rotation with the other of said members and formed in its periphery with a groove extending parallel to its axis, a second clutch element comprising an armature splined for axial movement on said disk into and out of pressure engagement with said electromagnet, and a block frictionally slidable in said groove and having a notch in its periphery receiving the inner periphery of said armature, the width of said notch being slightly greater than the entering portion of said armature, said block limiting the maximum permissible range of relative axial movement between said electromagnet and said armature and being adjustable by said armature in response to the approaching movement between said armature and said electromagnet to maintain said range substantially constant regardless of wear on said elements.

HOWARD D. COLMAN.